US011906811B2

(12) United States Patent
Guastadini (10) Patent No.: US 11,906,811 B2
(45) Date of Patent: Feb. 20, 2024

(54) DEVICE AND METHOD FOR FOCUSING A LIGHT BEAM

(71) Applicant: Datalogic IP Tech, S.r.l., Bologna (IT)

(72) Inventor: Fabrizio Guastadini, Bologna (IT)

(73) Assignee: Datalogic IP Tech, S.r.l., Bologna (IT)

( * ) Notice: Subject to any disclaimer, the term of this patent is extended or adjusted under 35 U.S.C. 154(b) by 491 days.

(21) Appl. No.: 17/262,941

(22) PCT Filed: Jul. 27, 2018

(86) PCT No.: PCT/IT2018/000103
§ 371 (c)(1),
(2) Date: Jan. 25, 2021

(87) PCT Pub. No.: WO2020/021578
PCT Pub. Date: Jan. 30, 2020

(65) Prior Publication Data
US 2021/0311284 A1    Oct. 7, 2021

(51) Int. Cl.
*G02B 7/10* (2021.01)
*G02B 13/00* (2006.01)
(Continued)

(52) U.S. Cl.
CPC ........... *G02B 7/102* (2013.01); *G02B 13/001* (2013.01); *G02B 26/085* (2013.01); *G03B 3/10* (2013.01);
(Continued)

(58) Field of Classification Search
CPC .... G02B 7/102; G02B 13/001; G02B 26/085; G03B 3/10; G03B 13/36;
(Continued)

(56) References Cited

U.S. PATENT DOCUMENTS 9,001,224 B2    4/2015 Moriya et al.
9,684,184 B2    6/2017 Miller et al.
(Continued)

FOREIGN PATENT DOCUMENTS

JP    2007143210    *    6/2007
JP    2007143210 A        6/2007
(Continued)

OTHER PUBLICATIONS

European Office Action, dated Jan. 28, 2022, issued in corresponding European Application No. 18793024.3, 4 pages.
(Continued)

*Primary Examiner* — Albert H Cutler
(74) *Attorney, Agent, or Firm* — Cozen O'Connor (57) ABSTRACT

A device for focusing a light beam comprises a optical assembly comprising at least one focusing lens and/or mirror, a support structure which supports the optical assembly, a magnetic actuator configured to move the optical assembly with respect to the support structure along a moving direction substantially parallel to an optical axis (X) of the optical assembly and at least one position sensor configured to provide an indication of the position of the optical assembly with respect to the support structure. The magnetic actuator comprises at least one permanent magnet integrally associated with the optical assembly and at least one first electrical winding integrally associated with the support structure and configured to cause flowing of an electric current within it, wherein the electrical current interacts with said at least one permanent magnet and causes the movement of the optical assembly along said moving direction until the optical assembly is brought to a desired focusing position. The focusing device comprises at least one second electrical winding integrally associated with the support structure and configured to be short-circuited so as
(Continued)

to generate, due to the electromagnetic induction generated by the relative motion between said at least one permanent magnet and said at least one second electrical winding, a braking force that opposes the movement of the optical assembly along said moving direction.

20 Claims, 5 Drawing Sheets

(51) Int. Cl.
    *G02B 26/08*     (2006.01)
    *G03B 3/10*     (2021.01)
    *G03B 13/36*     (2021.01)
    *H01F 7/16*     (2006.01)
    *H04N 23/54*     (2023.01)

(52) U.S. Cl.
    CPC .......... *G03B 13/36* (2013.01); *H01F 7/1615* (2013.01); *H04N 23/54* (2023.01); *G03B 2205/0069* (2013.01)

(58) Field of Classification Search
    CPC .......... G03B 2205/0069; H01F 7/1615; H04N 23/54; H04N 23/55; H04N 23/57; H04N 23/67

See application file for complete search history.

(56) References Cited

U.S. PATENT DOCUMENTS

| 2007/0086769 A1* | 4/2007 | Watanabe | G02B 7/08 396/133 |
| 2008/0197949 A1* | 8/2008 | Lurquin | G02B 7/102 335/229 |
| 2015/0077852 A1* | 3/2015 | Lam | G02B 7/04 359/557 |

FOREIGN PATENT DOCUMENTS

| JP | 2017003931 | * | 1/2017 |
| WO | 2007007223 A1 | | 1/2007 |

OTHER PUBLICATIONS

International Search Report and Written Opinion of the International Searching Authority dated Apr. 2, 2019, issued in corresponding International Application No. PCT/IT2018/00013, filed Jul. 27, 2018, 8 pages.

* cited by examiner

DEVICE AND METHOD FOR FOCUSING A LIGHT BEAM

The present invention relates to a device for focusing a light beam.

The present invention also relates to a method for focusing a light beam.

Preferably, the focusing device of the invention is used in apparatuses for acquiring optical information. However, such device may be used in apparatuses of different type, such as for example apparatuses for enlarging/reducing images previously framed (zoom).

In the present description and in the subsequent claims, the expression "acquiring optical information" is used to refer to the acquisition of information relating to an object (for example distance, volume, overall size, identifying data thereof, or characteristics thereof) through the acquisition and processing of a light signal diffused by the same object. The expression "optical information" is used in a broad sense and comprises optical codes and also more generally, images containing characteristics suitable for identifying and/or selecting an object, for example based on the shape and/or volume thereof.

The expression "optical code" is used to refer to any graphic representation having the function of storing a coded piece of information. A particular example of optical code consists of linear or two-dimensional codes, in which the information is encoded through suitable combinations of elements having a predetermined shape, for example square, rectangular or hexagonal, of dark color (normally black) separated by light elements (spaces, normally white), such as bar codes, stacked codes and two-dimensional codes in general, colour codes, etc. The expression "optical code" more generally also comprises other graphical forms with information encoding function, including characters printed in plain text (letters, numbers, etc.) and particular patterns (such as for example, stamps, logos, signatures, fingerprints, etc.). The expression "optical code" also comprises graphic representations which can be detected not only in the field of visible light, but also in the range of wave lengths comprised between the infrared and the ultraviolet.

For the sake of simplicity of disclosure, hereinafter explicit reference is made to the optical code readers with having an acquisition sensor, commonly classified as: imagers. However, the invention is also applied in other apparatuses for acquiring optical information, such as vision sensors, smart cameras for recognizing objects by detecting the shape or size characteristics thereof, and in general for artificial vision applications such as the quality control of objects in industrial processes. The invention is also applied in optical code readers with laser light beam emission, commonly called laser scanner, in which said laser light beam must be focused.

Typically, the optical codes readers comprise a module containing all the mechanical, optical and electronic components required to detect and read the optical code. Among other things, such components comprise a light emission source, a device for focusing the light beam diffused by the illuminated optical code and an acquisition sensor that acquires the light beam diffused by the optical code.

The focusing device comprises an optical focusing assembly that typically comprises at least one focusing lens or one focusing mirror. Such lens or mirror is intended to focus the light beam at a predetermined focusing distance, that corresponds to the distance between the optical focusing assembly and the acquisition sensor.

As known, the maximum resolution of an optical code reader, that is the minimum dimension of the details it may distinguish, is linked with the diameter of the light beam at the distance at which the light beam diffused by the illuminated optical code is focused.

For a wide range of applications, the focusing distance, that is the distance at which the light beam diffused by the illuminated optical code is desired to be focused, is not predetermined. In this case, it is advantageous to use devices capable of adjusting the focusing distance so as to extend the area within which the maximum resolution may be reached.

It is known to adjust the focusing distance by manually moving the optical focusing assembly with respect to acquisition sensor along the optical axis of the optical focusing assembly (hereinafter also "optical axis of the reader").

Focusing devices in which the focusing distance is automatically adjusted (autofocus) are also known.

U.S. Pat. No. 9,684,184 B2 discloses an actuator device for stabilizing the optical image of a lens assembly with respect to an image sensor in a camera. The lens assembly is movable with respect to a support structure which supports the device. It is provided a first electrical winding for the autofocus and a second electrical winding for stabilizing the optical image, as well as a plurality of magnets. The two windings are fixed to the support structure, while the magnets are fixed to the lens assembly. Through the adjustment of the current that passes in the two windings, the lens assembly is focused and the optical image is stabilized.

U.S. Pat. No. 9,001,224 B2 discloses a device for guiding a lens-holder that corrects the optical image in case of vibrations of the camera. The lens-holder is mobile with respect to a support structure of the device. It is provided a first electrical winding for the autofocus fixed to the lens-holder, a second electrical winding for the correction of vibrations fixed to the support structure, and a permanent magnet also fixed to the support structure. Through the adjustment of the current that passes in the two windings, the lens-holder is focused and the optical image is corrected.

The Applicant has noticed that in the devices of both the abovementioned documents, there is a need to provide a driving control unit that correctly sets the currents in the first and second electrical windings, at first to reach the desired focusing position and then to keep such focusing position over time.

The technical problem at the basis of the present invention is that of providing a focusing device alternative to the ones already known and that ensures quickly reaching the desired focusing position and keeping such position in the case of knocks or vibrations to the device.

Therefore, in a first aspect thereof, the present invention relates to a device for focusing a light beam, comprising:
- an optical assembly comprising at least one focusing lens and/or mirror;
- a support structure which supports the optical assembly;
- a magnetic actuator configured to move the optical assembly with respect to the support structure along a moving direction substantially parallel to an optical axis of the optical assembly;
- at least one position sensor configured to provide an indication of the position of the optical assembly with respect to the support structure;

wherein the magnetic actuator comprises:
- at least one permanent magnet integrally associated with one of the optical assembly and the support structure;
- at least one first electrical winding integrally associated with the other one of the optical assembly and the support structure and configured to cause flowing of an electric current within it, wherein the electrical current interacts with said at least one permanent magnet and causes the movement of the optical assembly along said moving direction until the optical assembly is brought to a desired focusing position;

characterized in that it comprises at least one second electrical winding integrally associated with the other one of the optical assembly and the support structure and configured to be short-circuited so as to generate, due to the electromagnetic induction generated by the relative motion between said at least one permanent magnet and said at least one second electrical winding, a braking force that opposes the movement of the optical assembly along said moving direction.

In the present description and in the subsequent claims, "moving direction substantially parallel to an optical axis" is used to refer to a moving direction which is perfectly rectilinear and parallel to the aforesaid optical axis or to a curvilinear moving direction having a trajectory defined by a line having a very broad radius of curvature, so that a reduced portion of such line may be similar to a straight line.

In the device of the invention, the short-circuiting of the second electrical winding automatically generates a force that opposes the movement of the optical focusing assembly. Such force is generated due to the electromagnetic induction generated by the relative motion between the at least one permanent magnet and the short-circuited second electrical winding during the adjustment of the focusing or in case of knocks or vibrations. Such a force allows stopping the optical assembly more quickly in order to reach the desired focusing position and facilitating the keeping of such position in case of knocks or vibrations to the device.

Therefore, there is no longer the need to provide an electronic driving with feedback of the second electrical winding, as instead is required in the devices according to U.S. Pat. No. 9,684,184 B2 and U.S. Pat. No. 9,001,224 B2. Given that such electronic driving is missing, possible undesired resonance phenomena are avoided.

The device of the invention preferably comprises the features discussed hereinbelow, individually or in combination.

The device of the invention may comprise a control circuit configured to selectively short-circuit said at least one second electrical winding. It is thereby possible to short-circuit the second electrical winding only when the optical focusing assembly has reached or is close to the desired focusing position, so that only then the force that opposes the movement of the optical focusing assembly and that allows stopping the optical assembly more quickly is generated. When the optical focusing assembly instead is located far from the desired focusing position, the control circuit interrupts the short-circuiting of the second electrical winding. Subsequently, in this operating step, the movement of the optical assembly towards the desired focusing position is not hindered by the aforesaid force and may be obtained by reducing the current that feeds the first electrical winding with respect to the case in which the second electrical winding is always short-circuited.

However, embodiments of the invention are provided in which said at least one second electrical winding is always short-circuited.

In all the embodiments of the invention, preferably, said at least one first electrical winding is substantially coaxial to said at least one second electrical winding. Such an arrangement allows containing the overall dimensions of the device.

According to a first preferred embodiment of the invention, said at least one permanent magnet is integrally associated with the optical assembly and said at least one first electrical winding and at least one second electrical winding are integrally associated with the support structure.

Hereinbelow some preferred features of the aforesaid first embodiment are discussed.

Preferably, the optical assembly has a radially outer surface that has a substantially cylindrical shape with a predetermined longitudinal axis coinciding with said optical axis.

Preferably, said at least one permanent magnet has a substantially annular shape and is fixed to the radially outer surface of the optical assembly.

Preferably, said at least one first electrical winding and at least one second electrical winding are arranged in a radially outer position with respect to said at least one permanent magnet.

Such configuration contributes to containing the overall dimensions of the device.

Preferably, the device of the invention comprises two first electrical windings arranged on opposite sides with respect to a symmetry plane of said support structure.

Preferably, said symmetry plane is substantially orthogonal to the optical axis.

Preferably, the device of the invention comprises two second electrical windings arranged on opposite sides with respect to said symmetry plane.

Advantageously, the arrangement of the first and second electrical windings on opposite sides with respect to said symmetry plane allows a quick movement of the optical assembly in both the ways of the moving direction.

According to a second preferred embodiment of the invention, said at least one permanent magnet is integrally associated with the support structure and said at least one first electrical winding and at least one second electrical winding are integrally associated with the optical assembly.

Hereinbelow some preferred features of the aforesaid second embodiment are discussed.

Preferably, the device of the invention comprises two permanent magnets facing each other and said at least one first electrical winding and at least one second electrical winding are at least partially interposed between the two permanent magnets.

In all the abovementioned embodiments thereof, the device of the invention preferably comprises at least one elastic element operatively interposed between the support structure and the optical assembly. The coupling of such elastic element with said short-circuited second electrical winding carries out an effective damping action of the motion on the optical assembly, wherein such a damping action allows stopping the optical assembly more quickly in the desired focusing position also upon possible knocks or vibrations of the device. Possible undesired resonance phenomena are automatically avoided as well.

The Applicant has indeed observed that the solution of the differential equation of the motion of the optical assembly in the device of the invention due to the use of elastic elements and of short-circuited or short-circuitable windings is a wave that is dampened quickly over time.

Preferably, said at least one elastic element comprises two leaf springs arranged on opposite sides with respect to the optical assembly.

More preferably, said two leaf springs are integrally associated with the support structure and with the optical assembly to substantially form an articulated quadrilateral.

In an alternative embodiment, said at least one elastic element comprises two helical springs or wave springs arranged on opposite sides with respect to the optical assembly.

The provision of two springs arranged on opposite sides with respect to the optical assembly coupled with said short-circuited second electrical winding allows an even quicker damping of the motion of the optical assembly and, therefore, a quicker reaching and maintaining of the desired focusing position, also upon vibrations or knocks of the device.

Preferably, the device of the invention comprises a power supply electric circuit which supplies said at least one first electrical winding.

Preferably, said at least one elastic element is a conductive element and said electric circuit comprises said at least one elastic element.

In a second aspect thereof, the present invention relates to a method for focusing a light beam, comprising the steps of:
  moving an optical assembly comprising at least one focusing lens and/or mirror with respect to a support structure along a moving direction substantially parallel to an optical axis of the optical assembly, said movement being obtained due to the magnetic interaction between at least one permanent magnet integrally associated with one of the optical assembly and the support structure and an electric current that flows within at least one first electrical winding integrally associated with the other one of the optical assembly and the support structure;
  detecting the position of said optical assembly with respect to said support structure;
  stopping the optical assembly at a desired focusing position;
  characterized in that the step of stopping the optical assembly comprises the step of short-circuiting at least one second electrical winding integrally associated with the other one of the optical assembly and the support structure so as to generate, due to the electromagnetic induction generated by the relative motion between said at least one permanent magnet and said at least one second electrical winding, a braking force that opposes the movement of the optical assembly along said moving direction.

Advantageously, such method may be actuated by the device of the invention described above and therefore allows obtaining all the advantages and technical effects described above with respect to the device of the invention.

Preferably, during the movement of the optical assembly towards said desired focusing position, said at least one second electrical winding is not short-circuited and is short-circuited only when the optical assembly reaches or is close to said desired focusing position.

The selective short-circuiting of the second electrical winding may occur by a specific control circuit.

Alternatively, said at least one second electrical winding is always short-circuited during the movement of the optical assembly towards said desired focusing position.

Figure 1:
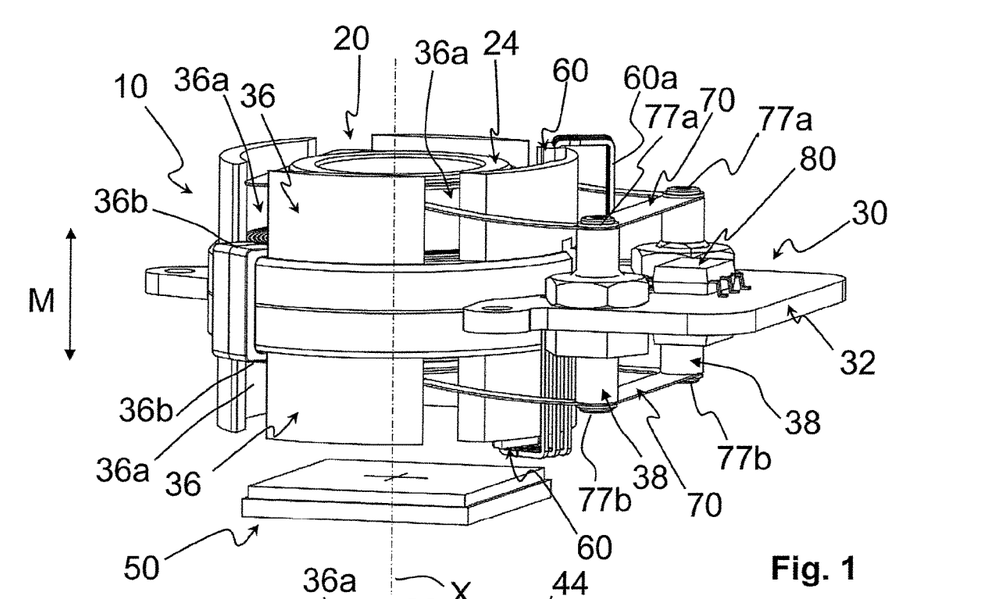
FIG. 1 is a schematic perspective view of a first embodiment of a focusing device according to the present invention.
Figure 2:
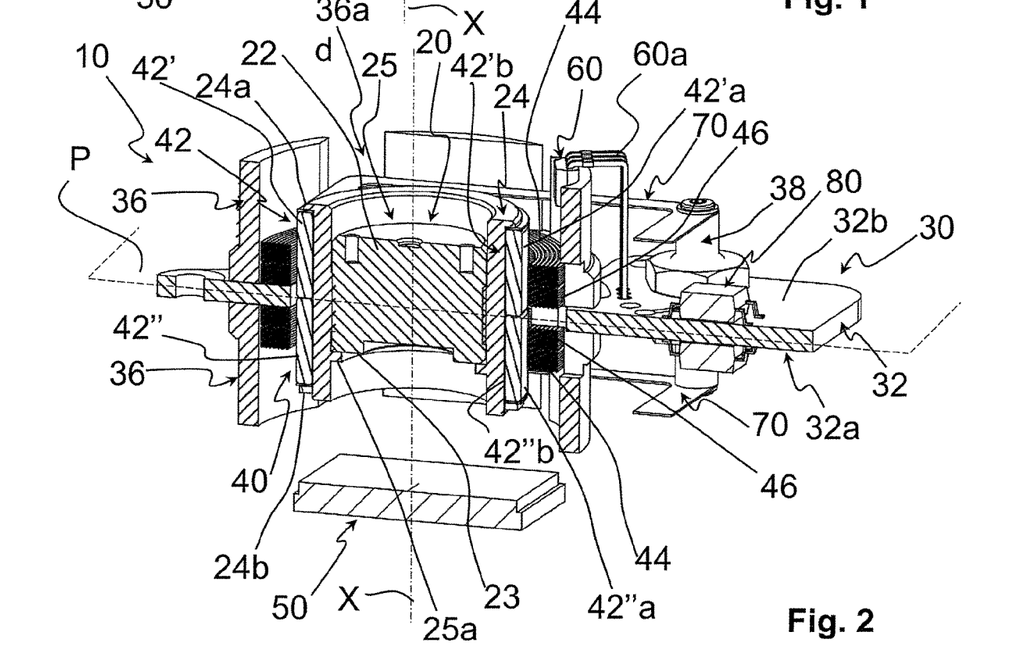
FIG. 2 is a cross-sectioned schematic perspective view of the device of FIG. 1.
Figure 3:
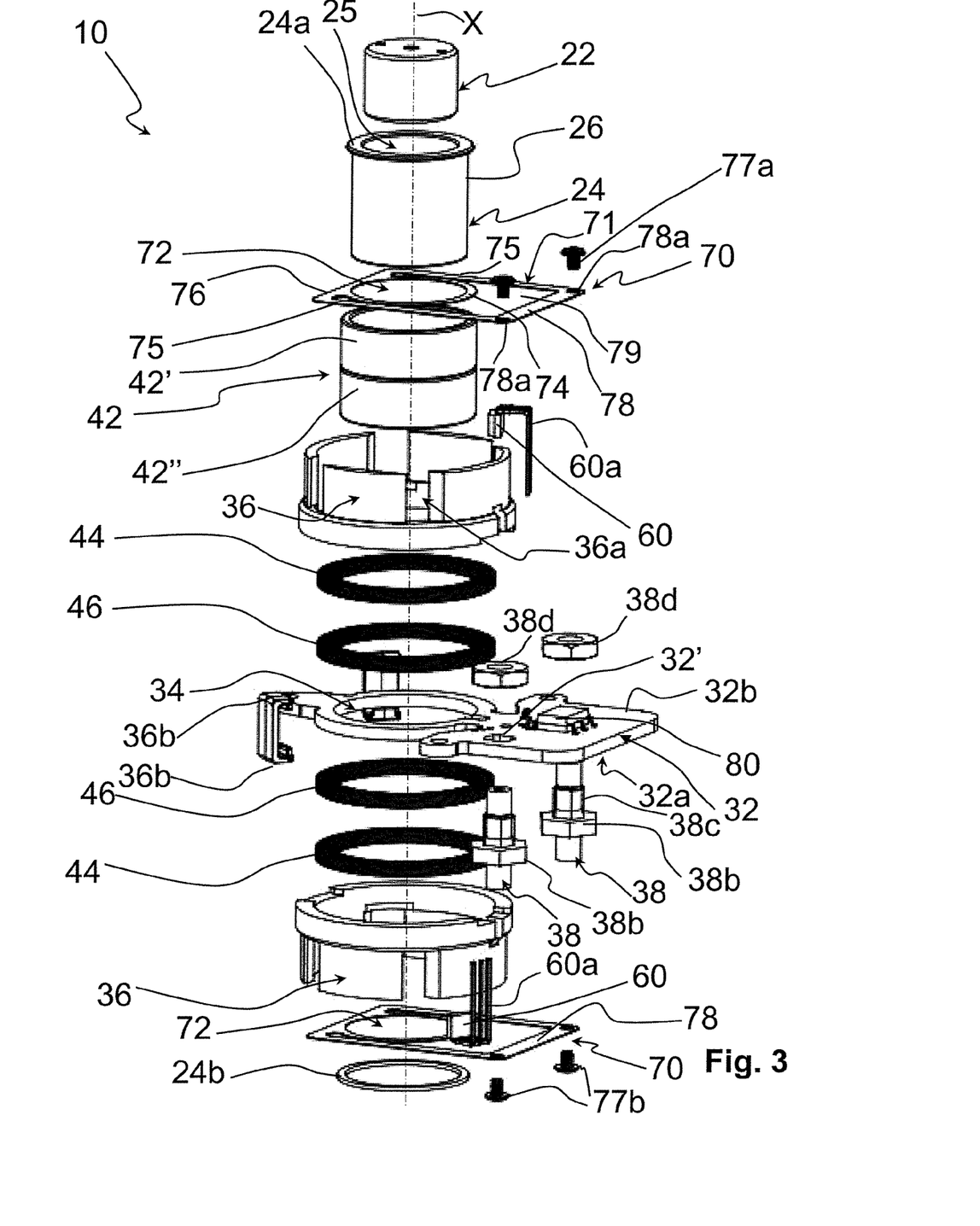
FIG. 3 is an exploded schematic perspective view of the device of FIG. 1.

Further features and advantages of the device and of the method of the present invention will be more evident from the following detailed description of preferred embodiments and implementations thereof, made for purely indicating and not limiting purposes with reference to the appended drawings. In such drawings:

FIGS. 1 to 3 show a first embodiment of a device for focusing a light beam according to the present invention. Such device is globally indicated with numeral reference 10.

The focusing device 10 comprises an optical assembly 20 and a support structure 30 which supports the optical assembly 20.

The optical assembly 20 is movable with respect to the support structure 30 along a moving direction M substantially parallel to an optical axis X of the optical assembly 20, as explained hereinafter.

In the present description and in the subsequent claims, the expressions "axial", "axially" and similar expressions refer to a direction substantially parallel to the optical axis X, while "radial", "radially" and similar expressions refer to a direction substantially perpendicular to the optical axis X.

As shown in FIGS. 2 and 3, the optical assembly 20 includes a focusing lens and/or a focusing mirror (generically indicated with 22). Several focusing lenses and/or focusing mirrors may be provided.

Hereinafter, reference is made to one focusing lens 22 for simplicity of disclosure.

The focusing device 10 also comprises an optical assembly for detecting the light beam diffused by an illuminated object and collected by the optical assembly 20. In the embodiment herein illustrated, the optical detection assembly includes an acquisition sensor 50, shown in FIGS. 1 and 2.

The movement of the optical assembly 20 with respect to the support structure 30 along the aforesaid moving direction M is controlled by a magnetic actuator 40 specifically configured for this purpose (FIG. 2).

In particular, the magnetic actuator 40 comprises a permanent magnet 42 integrally associated with the optical assembly 20 and a pair of first electrical windings 44 integrally associated with the support structure 30.

The two first electrical windings 44 are arranged on opposite sides with respect to a symmetry plane P of the support structure 30 substantially orthogonal to the optical axis X (FIG. 2).

The two first electrical windings 44 are coaxial to each other.

The optical assembly 20 comprises a cylindrical and hollow sleeve 24, which is preferably made of ferromagnetic material, in whose inner cavity 25 the focusing lens 22 is mounted.

The sleeve 24 has a radially outer surface 26 that has a substantially cylindrical shape with a predetermined longitudinal axis coinciding with the optical axis X.

The sleeve 24 has a flange 24a at a free end thereof.

The focusing lens 22 also has a substantially cylindrical shape and comprises a base portion 23 abutting against a circumferential relief 25a formed on the radially inner surface of the sleeve 24 (FIG. 2). Once inserted in the cavity 25 of the sleeve 24 and brought to abut against the circumferential relief 25a, the focusing lens 22 is integrally coupled to the sleeve 24.

The permanent magnet 42 has a substantially annular shape and is fixed on the radially outer surface 26 of the sleeve 24 and, therefore, to the radially outer surface of the optical assembly 20.

In the specific example of FIGS. 1 to 4, the permanent magnet 42 comprises two substantially cylindrical magnetic elements, a first magnetic element 42' and a second magnetic element 42" arranged on an opposite side with respect to the first magnetic element 42' with reference to a plane that, in the position taken on by the optical assembly 20 in FIG. 2, substantially coincides with the symmetry plane P of the support structure 30.

Both the magnetic elements 42', 42" are radially magnetized, but in opposite directions. In particular, with reference to FIG. 2, the north pole of the first magnetic element 42' is defined at the radially outer surface 42'a of the first magnetic element 42' and the south pole of the first magnetic element 42' is defined at the radially inner surface 42'b of the first magnetic element 42', while the north pole of the second magnetic element 42" is defined at the radially inner surface 42"b of the second magnetic element 42" and the south pole of the second magnetic element 42" is defined at the radially outer surface 42"a of the second magnetic element 42".

Alternatively, the permanent magnet 42 may be magnetized longitudinally.

The two first electrical windings 44 are arranged in a radially outer position with respect to the permanent magnet 42.

Each of the first electrical windings 44 is configured to allow the passage of an electric current that interacts with the permanent magnet 42 and causes the movement of the optical assembly 20 along the moving direction M.

In a radially outer position with respect to the permanent magnet 42, the focusing device 10 also comprises a pair of two second electrical windings 46, also integrally associated with the support structure 30 and arranged on opposite sides with respect to the symmetry plane P of the support structure 30.

Each of the second electrical windings 46 is configured to be short-circuited so as to generate, due to the electromagnetic induction generated by the relative motion between the permanent magnet 42 and the second electrical winding 46, a braking force that opposes the movement of the optical assembly 20 along the moving direction M.

In the non-limiting example shown in FIGS. 2-3, the two second electrical windings 46 are coaxial with respect to each other and also with respect to the two first electrical windings 44 and have a radial extension that is identical to that of the two first electrical windings 44.

In particular, the two second electrical windings 46 are arranged in an axially inner position with respect to the two first electrical windings 44, therefore closer to the symmetry plane P of the support structure 30 with respect to the two first electrical windings 44.

The support structure 30 comprises a plate 32 including a printed circuit. The aforesaid symmetry plane P of the support structure 30 coincides with the symmetry plane of the plate 32 (as shown in FIG. 2).

The plate 32 has a through hole 34 (FIG. 3) in which the optical assembly 20 and the permanent magnet 42 are housed with no interference.

The two second electrical windings 46 are fixed to the plate 32 and arranged coaxially to the through hole 34, on opposite sides of the plate 32 (FIG. 2).

In the non-limiting example shown in FIGS. 2-3, the two first electrical windings 44 and the two second electrical windings 46 have toroidal shape with a quadrilateral section.

The focusing device 10 comprises, in a radially outer position with respect to the first electrical windings 44 and to the second electrical windings 46, a pair of annular elements 36, preferably made of ferromagnetic material. Such annular elements 36 are mounted on the plate 32 on opposite sides thereof (FIG. 2). Each annular element 36 is externally wound around a respective first electrical winding 44 and a respective second electrical winding 46.

The focusing device 10 also comprises position sensors 60 configured to provide an indication of the position of the optical assembly 20 with respect to the support structure 30. In the non-limiting example shown in FIGS. 1-3, a respective Hall effect position sensor 60 is associated with each annular element 36. Such position sensors 60 have respective rheophores 60a coupled to the plate 32.

The focusing device 10 also comprises a pair of elastic elements 70 operatively interposed between the support structure 30 and the optical assembly 20. Such elastic elements 70 are arranged on opposite sides with respect to the optical assembly 20 and, therefore, with respect to the plate 32.

In the specific case shown in FIGS. 1-3, each elastic element is a leaf spring 70 having a substantially rectangular shape.

Each leaf spring 70 has a substantially rectangular outer frame 71 defined by two opposite short sides 76, 78 and two opposite long sides 75.

A through hole 72 is formed inside the outer frame 71 and close to one of the two short sides 76, the through hole 72 being defined by an annular frame 74 having such sizes as to house the sleeve 24 inside it (FIG. 3).

The short side 76 of each leaf spring 70 is housed inside the respective annular element 36.

A through opening 79 is provided inside the outer frame 71 and between the annular frame 74 and the other short side 78.

The short side 78 is connected to the support structure 30 by a pair of pins 38.

In particular, the short side 78 has two opposite holes 78a at the free ends of the pins 38.

The short side 78 of one of the two leaf springs 70 is fixed to the free ends of the pins 38 by a first pair of fixing elements 77a, while the corresponding short side 78 of the other leaf spring 70 is fixed to the opposite free ends of the pins 38 by a second pair of fixing elements 77b.

Each pin 38 crosses a respective through hole 32' of the plate 32 and has a radially projecting portion 38b that abuts against a face 32a of the plate 32 and an externally threaded portion 38c, on which a nut 38d is screwed, the nut 38d being arranged in abutment against the opposite face 32b of the plate 32 (FIGS. 1-3).

The annular frame 74 of one of the two leaf springs 70 is blocked between the permanent magnet 42 and the flange 24a of the sleeve 24.

The annular frame 74 of the other leaf spring 70 is blocked, at the side of the sleeve 24 opposite to the one in which the flange 24a is provided, between the permanent magnet 42 and an abutment ring 24b fitted, preferably by interference, on the radially outer surface 26 of the sleeve 24.

Each annular element 36 has axial through slits 36a (four slits 36a are provided in the non-limiting example shown in FIGS. 1-3). The long sides 75 of the outer frame 71 of the leaf spring 70 pass in a pair of said slits 36a in order to position the short side 76 of the leaf spring 70 inside the annular element 36.

Upon movement of the optical assembly 20 with respect to the support structure 30, the long sides 75 of the leaf spring 70 bend inside the slits 36a.

Some slits 36a have, in a position proximal to the plate 32, bumper elements 36b for the stroke end of the leaf spring 70.

The two leaf springs 70, with the optical assembly 20 and the support structure 30, substantially form an articulated quadrilateral.

It is apparent from what described above that the moving direction M of the optical assembly 20 substantially parallel to the optical axis X is not perfectly rectilinear, but rather it is a curvilinear moving direction having a trajectory defined by a line having a very broad radius of curvature. The trajectory travelled by the optical assembly 20 is similar to a rectilinear trajectory due to such a broad radius of curvature.

The focusing device 10 may comprise a control circuit 80 configured to selectively short-circuit the second electrical windings 46. The second electrical windings 46 are short-circuited only when the optical assembly 20 has reached or is close to the desired focusing position, so that only at that time the force that opposes the movement of the optical assembly 20 and that allows stopping the optical assembly 20 in such position more quickly is generated. The control circuit 80 interrupts the short-circuiting of the second electrical windings 46 when instead the optical assembly 20 is far from the desired focusing position.

Alternatively, the second electrical windings 46 may be always short-circuited.

The focusing device 10 comprises a power supply electric circuit for supplying the first electrical windings 44. Such electric circuit is included in the printed circuit of the plate 32.

The plate 32 with the printed circuit constitutes the main part of the support structure 30 and allows connecting directly without cables both the first and second electrical windings 44, 46 and the two Hall effect position sensors 60 as well as positioning the latter very close to the permanent magnet 42 without the need for supplementary magnets.

Thereby, the overall dimensions are reduced and the response signal is very intense. Moreover, the position sensors 60 are wound and shielded by the two annular elements 36 made of ferromagnetic material, which protect them from the disturbances of the external magnetic fields.

The magnetic field generated by the permanent magnet 42 crosses the first and second electrical windings 44, 46 in a direction orthogonal to the optical axis X and closes in the sleeve 24 and in the two annular elements 36. The first electrical windings 44 are supplied with opposite electric currents, so as to generate a Lorentz force the direction of the optical assembly 20 motion.

The first and second electrical windings 44, 46 preferably are glued to one another and to the plate 32, and the terminals thereof are welded on the printed circuit of the plate 32.

The permanent magnet 42 preferably is glued to the sleeve 24.

The sensors 60 preferably are glued inside the two annular elements 36 while the rheophores 60a of the two position sensors 60 preferably are directly welded on the printed circuit of the plate 32.

Two position sensors 60 are used so that the sum of the signals thereof remains constant, for each same position of the optical assembly 20, also upon a possible demagnetization over time of the permanent magnet 42, thus allowing an automatic compensation.

Figure 4:
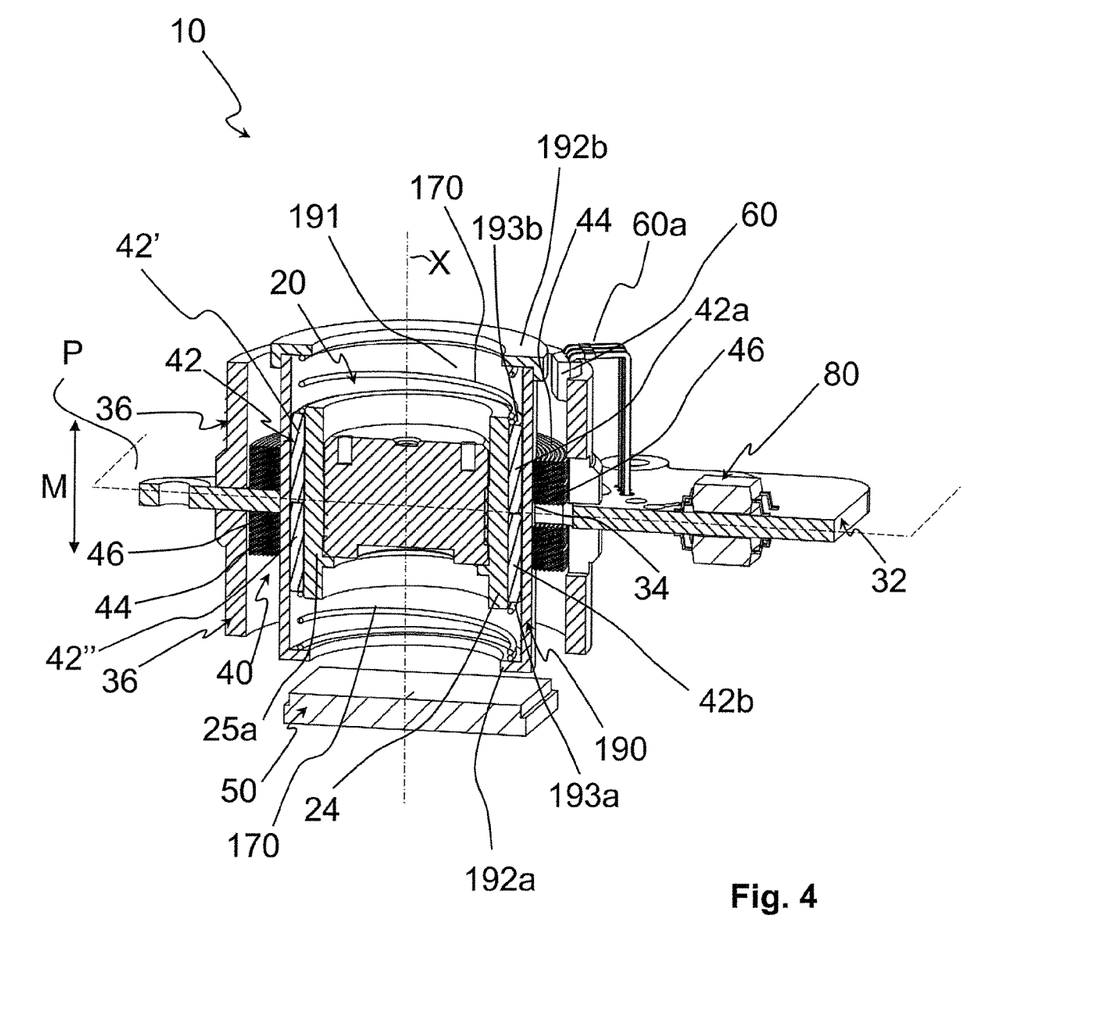
FIG. 4 is a cross-sectioned schematic perspective view of a second embodiment of a focusing device according to the present invention.

FIG. 4 shows a second embodiment of a device for focusing a light beam according to the present invention. Also such a device is globally indicated with reference numeral 10.

Components and portions of the focusing device 10 of FIG. 4 that are identical or functionally similar those of the focusing device 10 of FIGS. 1-3 are indicated with the same reference numerals and for them reference is made to the above description.

The focusing device 10 of FIG. 4 differs from the focusing device 10 of FIGS. 1-3 essentially in that it provides a movement of the optical assembly 20 that is perfectly rectilinear and parallel to the optical axis X.

This is obtained by interposing, between the electrical windings 44, 46 and the permanent magnet 42, a guide sleeve 190 having a longitudinal axis coinciding with the optical axis X.

The guide sleeve 190 preferably is made of plastic material and has an axial cavity 191 in which the assembly formed by the optical assembly 20 and by the permanent magnet 42 is slidingly housed. In particular, the permanent magnet 42 is capable of sliding on the radially inner surface of the guide sleeve 190. The guide sleeve 190 substantially acts as sliding bearing.

The guide sleeve 190 preferably is glued in the through hole 34 of the plate 32 of the support structure 30.

The focusing device 10 of FIG. 4 is identical to the one of FIGS. 1-3 except for the features discussed above and for the type of elastic elements operatively interposed between the support structure 30 and the optical assembly 20.

In the non-limiting example shown in FIG. 4, a pair of helical springs 170 is indeed provided in place of the pair of leaf springs 70, the helical springs 170 being arranged on opposite sides with respect to the optical assembly 20. Alternatively, wave springs may be used so as to limit the dimensions of the device 10 in the moving direction M.

Each helical spring 170 is housed inside the guide element 190 and is operatively interposed between the optical assembly 20 and a respective abutment ring 192a, 192b. The abutment ring 192a is formed on the guide element 190 at a free end thereof and acts as an abutment for one of the two helical springs 170. The abutment ring 192b is fixed to the opposite free end of the guide element 190 and acts as an abutment for the other helical spring 170.

The axial extension of the permanent magnet 42 is less than the axial extension of the sleeve 24 of the optical assembly 20. Two opposite housing seats 193a, 193b are provided between the sleeve 24 and the guide element 190, each for a respective end of a respective helical spring 170.

Figure 5:
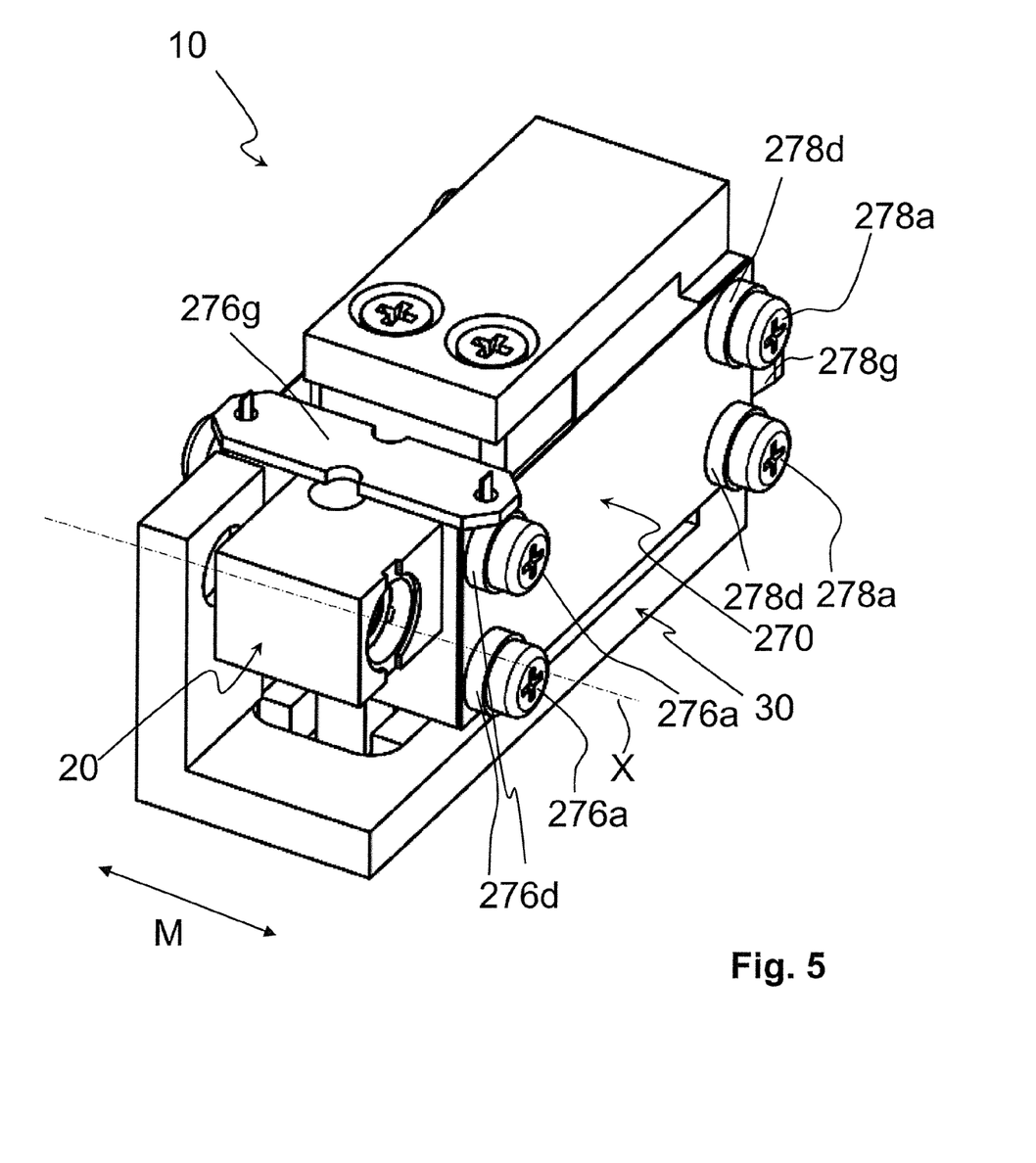
FIG. 5 is a schematic perspective view of a third embodiment of a focusing device according to the present invention.
Figure 6:
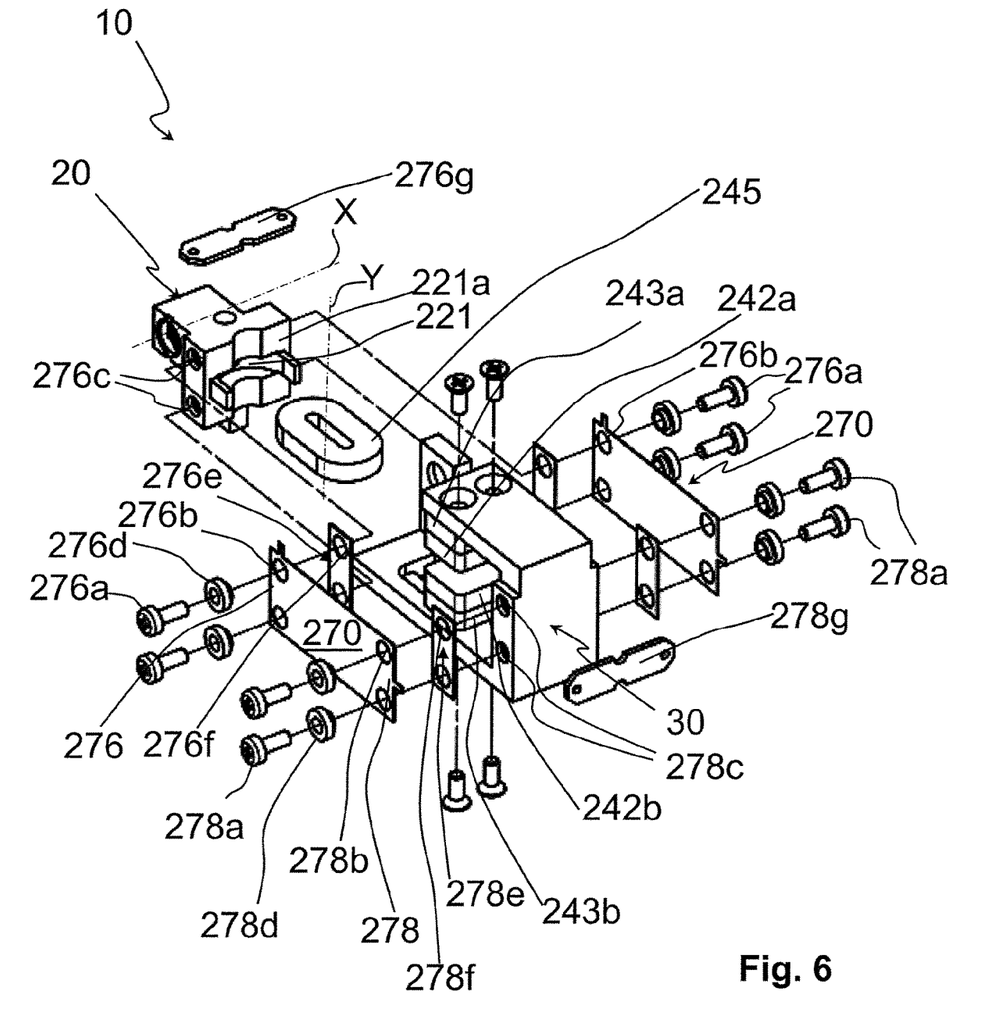
FIG. 6 is an exploded schematic perspective view of the device of FIG. 5.

FIGS. 5 and 6 show a third embodiment of a device for focusing a light beam according to the present invention. Also such a device is globally indicated with reference numeral 10.

Components and portions of the focusing device 10 of FIGS. 5 and 6 that are identical or functionally similar to those of the focusing device 10 of FIGS. 1-3 are indicated with the same reference numerals and for them reference is made to the above description.

The focusing device 10 of FIGS. 5 and 6 differs from the focusing device 10 of FIGS. 1-3 essentially in the different configuration of the magnetic actuator 40 and in the different configuration of the elastic elements that connect the optical assembly 20 to the support structure 30.

As shown in FIG. 6, in this case a pair of permanent magnets 242a, 242b that are integrally associated with the support structure 30 are provided, while the first and second electrical winding 44, 46 are integrally associated with the optical assembly 20.

In the non-limiting example shown in FIGS. 5 and 6, the support structure 30 has a "U"-shaped portion, with the two arms of the U that support the two permanent magnets 242a, 242b.

The two permanent magnets 242a, 242b face to each other and a gap 243a, 243b is interposed between each permanent magnet 242a, 242b and the respective arm of the support structure 30.

In the non-limiting example shown in FIG. 6, the aforementioned two electrical windings 44, 46 (not shown in FIG. 6) define a single coil 245 having a double winding. In particular, the coil 245 has a toroidal shape and a quadrilateral section.

The optical assembly 20 has a side face 221a facing towards the two permanent magnets 242a, 242b. A seat 221 wherein a portion of the coil 245 is housed is formed on such a side face. Preferably, the coil 245 is glued to the seat 221.

An opposite portion of the coil 245 is partially interposed between the two permanent magnets 242a, 242b.

The optical axis X of the optical assembly 20 is substantially parallel to the side face 221a and is substantially orthogonal to the axis Y of the coil 245.

In the non-limiting example shown in FIGS. 5 and 6, a pair of leaf springs 270 is provided. Said leaf springs 270 are operative on opposite sides with respect to the optical assembly 20.

The leaf springs 270 have a configuration different than that of the leaf springs 70 of the focusing device 10 of FIGS. 1-3.

The leaf spring 270 has a substantially rectangular shape, with two opposite short sides 276, 278 and two opposite long sides. One of the two short sides 276 is fixed to the optical assembly 20, while the opposite short side 278 is fixed to the support structure 30.

The two permanent magnets 242a, 242b and the two gaps 243a, 243b, and also the coil 245, are arranged between the two opposite leaf springs 270.

The two leaf springs 270 are arranged on opposite sides with respect to the optical assembly 20 and, as stated above, are integrally associated with the support structure 30 and with the optical assembly 20 to substantially form an articulated quadrilateral.

The fixing of the short side 276 to the optical assembly 20 is obtained through a pair of screws 276a that cross respective holes 276b formed on a respective leaf spring 270 and that are screwed in respective threaded holes 276c provided on the optical assembly 20. A washer 276d made of electrically insulating material is provided between the head of each screw 276a and the leaf spring 270. A plate 276e made of electrically insulating material and having a pair of holes 276f for the passage of the screws 276a is provided at the short side 276 of the leaf spring 270, between the leaf spring 270 and the optical assembly 20.

The fixing of the short side 278 to the support structure 30 is obtained through a pair of screws 278a that cross respective holes 278b formed on a respective leaf spring 270 and that are screwed in respective threaded holes 278c provided on the support structure 30. A washer 278d made of electrically insulating material is provided between the head of each screw 278a and the leaf spring 270. A plate 278e made of electrically insulating material and having a pair of holes 278f for the passage of the screws 278a is provided at the short side 278 of the leaf spring 270, between the leaf spring 270 and the support structure 30.

The leaf springs 270 are made of conductive material.

Although it is not illustrated, also the focusing device 10 of FIGS. 5 and 6 comprises a power supply electric circuit for supplying the first electrical winding of the coil 245. The leaf springs 270 are part of this electric circuit.

The focusing device 10 of FIGS. 5 and 6 also comprises two plates 276g, 278g, each including a printed circuit. The plates 276g, 278g connect the two opposite leaf springs 270 close to or at the shorter sides 276, 278.

The ends of the two pairs of wires of the coil 245 preferably are welded to the plate 276g. The cables for the external power supply are preferably connected on the plate 278g. The plates 276g and 278g in turn are preferably welded to the two leaf springs 270 at specific connecting appendages so as to ensure the electrical conduction.

Thus, the electric power supply of the first electrical winding 44 of the coil 245 occurs through the two leaf springs 270 made of conductive material and the two plates 276g, 278g without the use of cables that would be stressed by the movement with the risk of breaking. This arrangement allows moving the optical assembly 20 thanks to the Lorentz force that is induced on the coil 245 due to the magnetic field generated by the permanent magnets 242a, 242b and closed on the gaps 243a, 243b.

Instead, the second electrical winding 46 of the coil 245 is short-circuited with the purpose, also in this case, of generating a force proportional to the speed that opposes the motion due to the electromagnetic induction. The insulating plates 276e, 278e and the insulating washers 276d, 278d have the purpose of electrically insulating the conductive leaf springs 270 from the support structure 30, from the optical assembly 20 and from the screws 276a, 278a.

Also in this case, the moving direction M of the optical assembly 20 is not perfectly rectilinear, but rather it is a curvilinear moving direction having a trajectory defined by a line having a very broad radius of curvature. The trajectory travelled by the optical assembly 20 is similar to a rectilinear trajectory due to such broad radius of curvature.

In the operation of all the focusing devices 10 described above, the optical assembly 20 is moved with respect to the support structure 30 along a moving direction M substantially parallel to the optical axis X of the optical assembly 20.

Such a movement is obtained due to the magnetic interaction between permanent magnets 42, 242a, 242b integrally associated with one of the optical assembly 20 and the support structure 30 and an electric current flowing within the first electrical windings 44 integrally associated with the other one of the optical assembly 20 and the support structure 30.

The position of the optical assembly 20 with respect to the support structure 30 is detected by the position sensors 60.

The optical assembly 20 is stopped more quickly at a desired focusing position due to the electromagnetic induction generated by the relative motion between the permanent magnets 42, 242a, 242b and the second electrical winding 46. Such a relative motion indeed generates an induced electric current that in turn generates a braking force that opposes the movement of the optical assembly 20 along the moving direction M.

During the movement of the optical assembly 20 towards the desired focusing position, the second electrical winding 46 might not be short-circuited and might be short-circuited only when the optical assembly 20 reaches or is close to the desired focusing position or, alternatively, the second electrical winding 46 is always short-circuited during the movement of the optical assembly 20 towards the desired focusing position.

In the first case, the selective short-circuiting of the second electrical winding 46 occurs by means of a specific control circuit 80.

Of course, those skilled in the art may make further modifications and variants to the above-described invention with the purpose of satisfying specific and contingent requirements, such variants and modifications in any case falling within the scope of protection as defined by the subsequent claims.

The invention claimed is:

1. A device for focusing a light beam, comprising:
   an optical assembly comprising at least one focusing lens and/or mirror;
   a support structure which supports the optical assembly;
   a magnetic actuator configured to move the optical assembly with respect to the support structure along a moving direction substantially parallel to an optical axis of the optical assembly;
   at least one position sensor configured to provide an indication of the position of said optical assembly with respect to said support structure;
   wherein the magnetic actuator comprises:
      at least one permanent magnet integrally associated with one of the optical assembly and the support structure;
      at least one first electrical winding integrally associated with the other one of the optical assembly and the support structure and configured to allow a passage of an electric current that interacts with said at least one permanent magnet and causes a movement of the optical assembly along said moving direction until the optical assembly is brought to a desired focusing position; and
      at least one second electrical winding integrally associated with the other one of the optical assembly and the support structure and configured to be short-circuited in response to the position of the optical assembly as indicated by said at least one position sensor reaching a defined position that is close to said desired focusing position so as to generate, due to an electromagnetic induction generated by a relative motion between said at least one permanent magnet and said at least one second electrical winding, a braking force that opposes the movement of the optical assembly along said moving direction.

2. The device according to claim 1, comprising a control circuit communicatively coupled and operable to selectively short-circuit said at least one second electrical winding.

3. The device according to claim 2, wherein said at least one permanent magnet is integrally associated with the support structure and said at least one first electrical winding and at least one second electrical winding are integrally associated with the optical assembly.

4. The device according to claim 1, wherein said at least one first electrical winding is substantially coaxial and non-concentric to said at least one second electrical winding.

5. The device according to claim 4, wherein said at least one permanent magnet is integrally associated with the support structure and said at least one first electrical winding and at least one second electrical winding are integrally associated with the optical assembly.

6. The device according to claim 1, wherein said at least one permanent magnet is integrally associated with the optical assembly and said at least one first electrical winding and at least one second electrical winding are integrally associated with the support structure.

7. The device according to claim 6, wherein the optical assembly has a radially outer surface that has a substantially cylindrical shape with a predetermined longitudinal axis coinciding with said optical axis, wherein said at least one permanent magnet has a substantially annular shape and is fixed to the radially outer surface of the optical assembly, wherein said at least one first electrical winding and at least one second electrical winding are arranged in a radially outer position with respect to said at least one permanent magnet.

8. The device according to claim 7, comprising two first electrical windings arranged on opposite sides with respect to a symmetry plane of said support structure and two second electrical windings arranged at opposite sides with respect to said symmetry plane, wherein said symmetry plane is substantially orthogonal to the optical axis.

9. The device according to claim 1, wherein said at least one permanent magnet is integrally associated with the support structure and said at least one first electrical winding and at least one second electrical winding are integrally associated with the optical assembly.

10. The device according to claim 1, comprising at least one elastic element operatively interposed between said support structure and said optical assembly.

11. The device according to claim 10, comprising a power supply electric circuit which supplies said at least one first electrical winding, wherein said at least one elastic element is a conductive element and said electric circuit comprises said at least one elastic element.

12. The device according to claim 11, wherein said at least one elastic element comprises two leaf springs arranged on opposite sides with respect to said optical assembly, wherein said two leaf springs are integrally associated with the support structure and the optical assembly to substantially form an articulated quadrilateral.

13. The device according to claim 11, wherein said at least one elastic element comprises two helical springs or wave springs arranged on opposite sides with respect to said optical assembly.

14. The device according to claim 10, wherein said at least one elastic element comprises two leaf springs arranged on opposite sides with respect to said optical assembly, wherein said two leaf springs are integrally associated with the support structure and the optical assembly to substantially form an articulated quadrilateral.

15. The device according to claim 10, wherein said at least one elastic element comprises two helical springs or wave springs arranged on opposite sides with respect to said optical assembly.

16. A device for focusing a light beam, comprising:
    an optical assembly comprising at least one focusing lens and/or mirror;
    a support structure which supports the optical assembly;
    a magnetic actuator configured to move the optical assembly with respect to the support structure along a moving direction substantially parallel to an optical axis of the optical assembly;
    at least one position sensor configured to provide an indication of the position of said optical assembly with respect to said support structure;
    wherein the magnetic actuator comprises:
       at least one permanent magnet integrally associated with one of the optical assembly and the support structure;

at least one first electrical winding integrally associated with the other one of the optical assembly and the support structure and configured to allow a passage of an electric current that interacts with said at least one permanent magnet and causes a movement of the optical assembly along said moving direction until the optical assembly is brought to a desired focusing position; and at least one second electrical winding integrally associated with the other one of the optical assembly and the support structure and configured to be short-circuited so as to generate, due to an electromagnetic induction generated by a relative motion between said at least one permanent magnet and said at least one second electrical winding, a braking force that opposes the movement of the optical assembly along said moving direction, and wherein said at least one permanent magnet is integrally associated with the support structure and said at least one first electrical winding and at least one second electrical winding are integrally associated with the optical assembly, and said at least one permanent magnet integrally associated with one of the optical assembly and the support structure comprises two permanent magnets facing each other, wherein said at least one first electrical winding and said at least one second electrical winding are at least partially interposed between the two permanent magnets.

17. The device according to claim 16, wherein said at least one second electrical winding is always short-circuited.

18. The device according to claim 17, wherein said at least one permanent magnet is integrally associated with the support structure and said at least one first electrical winding and at least one second electrical winding are integrally associated with the optical assembly.

19. A method for focusing a light beam, comprising:

moving an optical assembly comprising at least one focusing lens and/or mirror with respect to a support structure along a moving direction substantially parallel to an optical axis of the optical assembly, a movement being obtained due to a magnetic interaction between at least one permanent magnet integrally associated with one of the optical assembly and the support structure and an electric current that flows within at least one first electrical winding integrally associated with the other of the optical assembly and the support structure;

detecting a position of said optical assembly with respect to said support structure by at least one position sensor;

short-circuiting at least one second electrical winding integrally associated to the other of the optical assembly and the support structure in response to the position of the optical assembly, as detected by said at least one position sensor, reaching a defined position that is close to a desired focusing position so as to generate, due to an electromagnetic induction generated by a relative motion between said at least one permanent magnet and said at least one second electrical winding, a braking force that opposes the movement of the optical assembly along said moving direction so at to stop the optical assembly at said desired focusing position.

20. The method according to claim 19, wherein, during the movement of said optical assembly towards said desired focusing position, said at least one second electrical winding is not short-circuited and is short-circuited only when said optical assembly close to and at said desired focusing position.

\* \* \* \* \*